July 28, 1964     A. J. BURKE     3,142,419

MATERIAL HANDLING AND DISPENSING APPARATUS

Filed Feb. 23, 1961     2 Sheets-Sheet 1

INVENTOR
Arthur J. Burke

BY Norris & Bateman
ATTORNEYS

July 28, 1964           A. J. BURKE           3,142,419
MATERIAL HANDLING AND DISPENSING APPARATUS
Filed Feb. 23, 1961           2 Sheets-Sheet 2
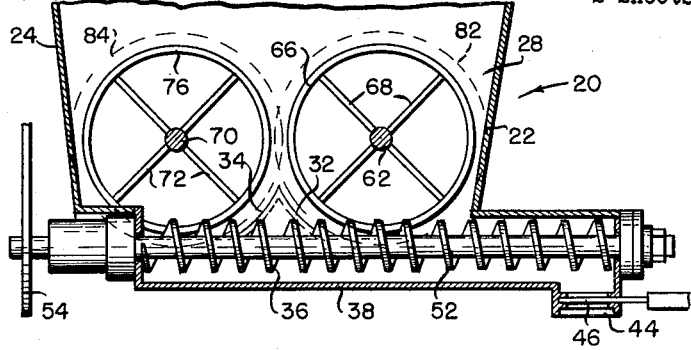
Fig. 4
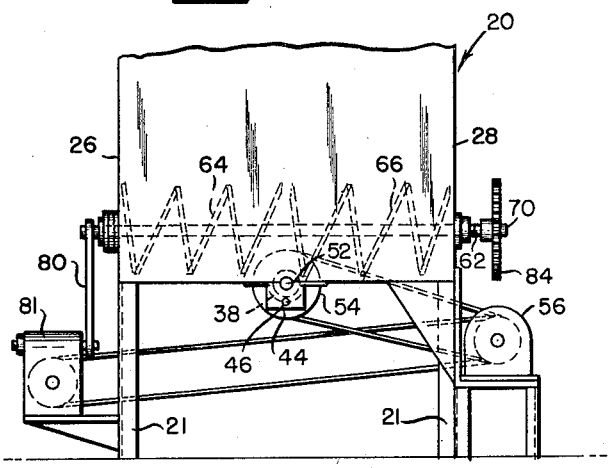
Fig. 5
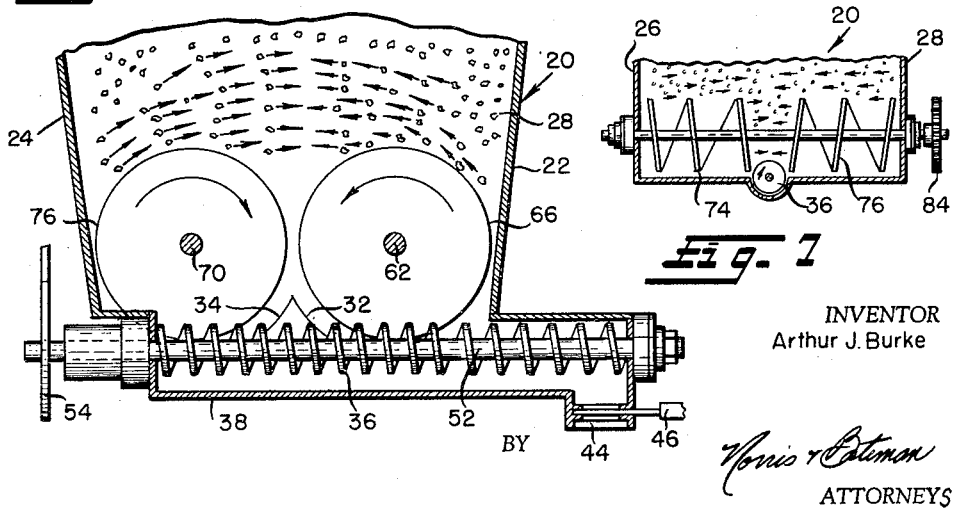
Fig. 6
Fig. 7
INVENTOR
Arthur J. Burke
BY
ATTORNEYS

United States Patent Office 3,142,419
Patented July 28, 1964

3,142,419
MATERIAL HANDLING AND DISPENSING
APPARATUS
Arthur J. Burke, Oakland, N.J., assignor, by mesne assignments, to Richardson Corporation, a corporation of New Jersey
Filed Feb. 23, 1961, Ser. No. 90,986
12 Claims. (Cl. 222—236)

The present invention relates to material handling and dispensing apparatus and more particularly to a feeding apparatus for discharging from a bottom outlet in a storage receptacle a pulverulent material which has a tendency to adhere to the walls of the receptacle, cake and even bridge or arch.

In storing bulk material in open bins or troughs it is the usual practice to draw the stored material to an outlet disposed in the bottom of the bin by means of a horizontal screw conveyor. In order to insure that an adequate amount of material is available for discharge, a horizontally disposed auger or collecting screw have been proposed to move the material toward the discharge screw conveyor to thereby more ensure complete filling of the flights of the discharge screw conveyor. By filling the discharge screw conveyor flights and by collecting the material as it descends by gravity into the collecting screw, the rate of discharge becomes more reliable and consistent.

With certain pulverulent, flaky or fluctuant materials, such as powdered pigments and materials containing small amounts of liquids, application of relatively slight pressures causes the individual particles to mass together and adhere to the storage container walls. Since much of the weight of the stored mass of particles above the collecting screw is supported by the collecting screw, rotation thereof moves the mass in a direction, part sidewise or lateral and part axially.

The stored mass above the collecting screw continues to settle down on the rotating screw to remain in contact with the screw flights and the material within the flights and is continually laterally shifted in the direction in which the upper periphery of the screw is moving. The lateral shift of the mass establishes a pressure which causes remote particles to be impinged against one of the side walls of the storage container. The continual axial shifting of the mass in the direction of the movement of material within the screw flights establishes a pressure which causes remote particles to impinge against one end wall of the storage container. Where the material is characterized by a tendency to adhere to other surfaces and to become compacted into a coherent mass, the particles of the mass impinged against the container walls adhere to the walls and eventually build up formations. Often, bridges of compacted particles are formed, and, as a consequence, this interferes with a gravitational flow of material into the flights of the screw.

Eventually, accumulations of the adhered particles gives rise to the necessity of scraping the storage bin side walls to remove the residue material so as to facilitate free gravitational flow of material to the collecting screw and to make full use of the storage volume provided for by the receptacle.

With the present invention, the problems attributable to adherence of material to the storage receptacle walls as a result of the motion imparted to the particles above the collecting and discharge screws is substantially eliminated. This is accomplished according to the present invention by providing for an arrangement of collecting screw conveyors located at the bottom of the storage receptacle and above the discharge screw conveyor in which the particles propelled in a combined direction move toward the center of the stored mass and against other particles to which a similar but generally opposite motion is imparted.

The collecting screws of the present invention are further arranged relative to the discharge screw to counteract the tendency of the discharge screw to impinge particles against the storage receptacle side wall and to shear off any material which the discharge screw does impinge against the wall.

Thus, it is the primary objective of the present invention to provide for a novel screw type dispensing apparatus for a storage receptacle in which the impingement of particles against the receptacle walls as a result of the motion imparted to the particles by rotation of the screws is substantially eliminated.

A further object of the present invention is to provide for a novel screw conveyor dispensing apparatus for a storage receptacle having a horizontal discharge screw conveyor for drawing material out of the receptacle and collecting screws immediately above the discharge screw conveyor for moving material into the flights of the discharge screw wherein the arrangement of the collecting screws is such that the sideward and forward movement imparted to particles above the collecting screws is directed toward the center of the receptacle and the stored mass, and across the path of other particles to which a motion has been imparted.

A more specific object of the present invention is to provide for a novel storage receptacle discharge screw conveyor apparatus having a discharge screw conveyor and two pair of side-by-side generally horizontal collecting screws immediately above the discharge conveyor and extending transversely thereto wherein the side-by-side collecting screws rotate in opposite directions with the upper peripheries of each collecting screw traveling away from the most adjacent side wall of the receptacle so that the motion imparted to the particles above the collecting screws as a result of the rotation of the screws is toward the middle of the receptacle.

Still another object of the present invention is to provide for an improved receptacle discharge screw conveyor comprising a horizontal discharge screw at the bottom of the receptacle for drawing stored material out of the receptacle and two side-by-side collecting screws each having two oppositely spiralled ribbon sections on opposite sides of the discharge screw for moving material axially and from the ends toward the discharge screw wherein the collecting screws are mounted to rotate in opposite directions with their upper peripheries turning toward each other and toward the center of the stored mass. The motion in the axial direction so imparted to the particles above the collecting screw as a result of the movement of material within the flights of the collecting screw is also toward the middle of the receptacle.

Further objects will appear as the description proceeds in connection with the annexed drawings and the appended claims wherein:

FIGURE 4 is a section taken along lines 4—4 of FIGURE 2;

FIGURE 5 is an elevational view showing the drive for the collecting screws and the discharge screw; and FIGURES 6 and 7 are views similar to FIGURES 4 and 5 but showing the motions imparted to the mass of particles above the collecting screws.

Figure 1:
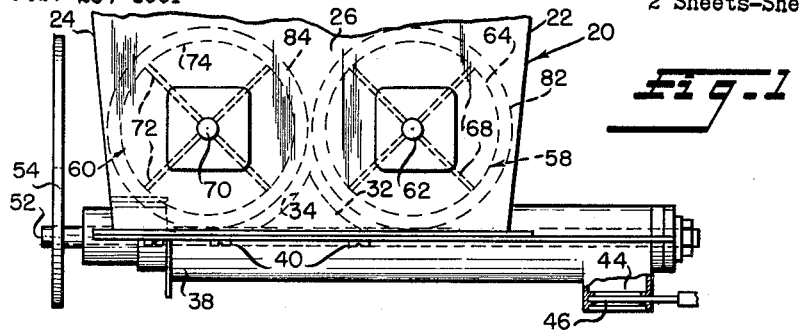
FIGURE 1 is a fragmentary side elevation showing the screw conveyor dispensing apparatus according to a preferred embodiment of the present invention.

Referring now to the drawings and more particularly to FIGURES 1–5 showing the construction according to a preferred embodiment of the invention, the reference numeral 20 generally designates a storage bin having an open top of generally rectangular shape and suitably supported as by beams or standards 21 (FIGURE 5). Bin 20 is formed by diverging side walls 22 and 24, vertical parallel end walls 26 and 28 extending generally at right angles to walls 22 and 24, and a bottom wall 30 which forms a pair of side by side gutters 32 and 34 extending longitudinally between end walls 26 and 28. Bin 20 is fabricated from suitable rigid metal plates having sufficient thickness to withstand distortion caused by the pressure of the stored mass.

In order to draw material from bin 20, a conventional helically ribboned discharge screw conveyor 36 is provided at the bottom of bin 20 and is mounted in a casing 38 which has an open top and which is fixedly secured to the bottom of bin 20 as by screws 40 (FIGURE 1). At its discharge end, casing 38 is provided with a bottom outlet 44 having a slide valve 46 for controlling the discharge of material carried forward between the flights of screw 36.

Figure 3:
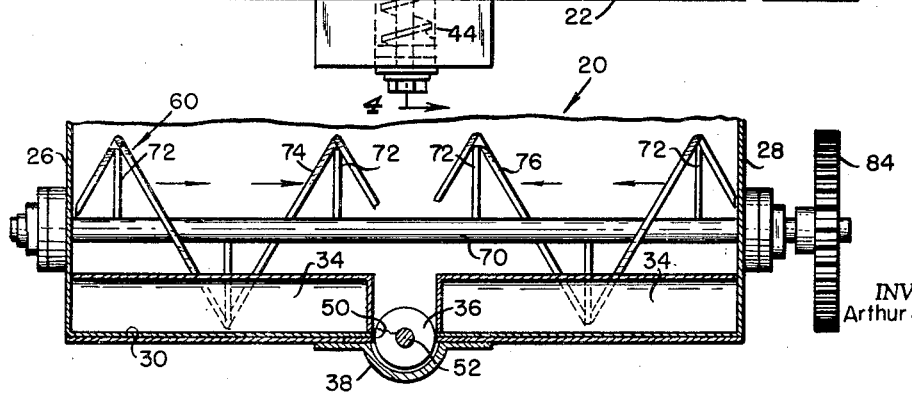
FIGURE 3 is a section taken along lines 3—3 of FIGURE 2.

The bottom wall 30 of bin 20 is formed with a generally elongated rectangular opening 50 which registers with the open top of casing 38. As best shown in FIGURE 3, the upper portion of screw 36 projects upwardly into the interior of bin 20 and extends from side wall 24 to a position beyond side wall 22 and above the outlet opening 44 in casing 38. Screw 36 is provided with a central shaft 52 which is suitably journalled in casing 38 for rotation about an axis extending parallel to end walls 26 and 28 and which is continuously rotatably driven through a conventional chain and sprocket assembly 54 by a motor 56, as shown in FIGURE 5.

In order to insure a constant rate at which discharge screw 36 is able to draw material from bin 20, a pair of identical helically spiralled collecting screw conveyors 58 and 60 are provided for which move material into the flights of the discharge screw 36. As shown, collecting screws 58 and 60 support substantially all of the stored mass in bin 20 and have diameters which are appreciably greater than that of screw 36.

Figure 2:
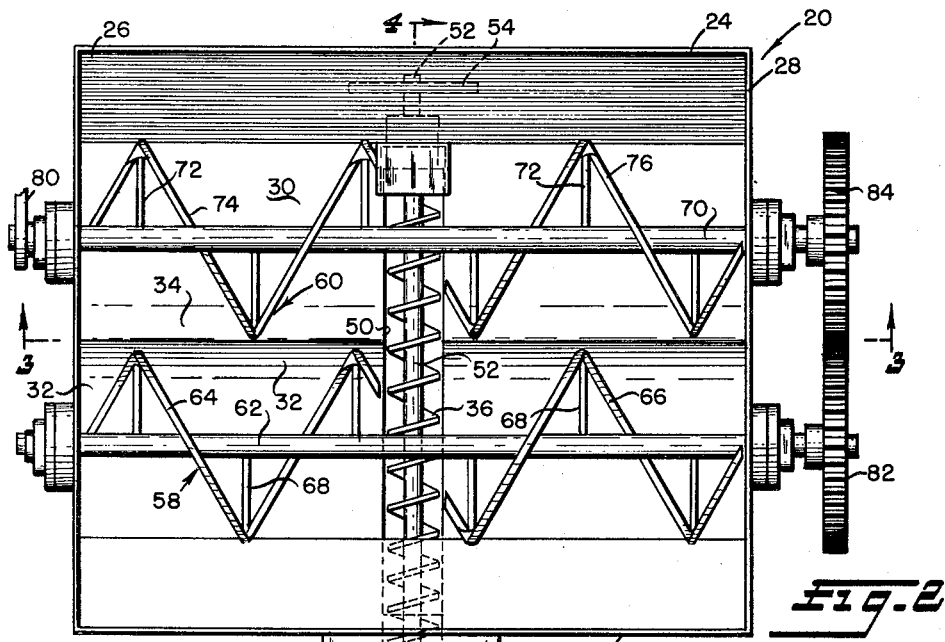
FIGURE 2 is a top plan view showing the arrangement of the collecting screws and the discharge screw according to the invention.

Collecting screw 58 comprises a rigid shaft 62 suitably journaled in bin 20 for rotation about an axis extending at right angles to end walls 26 and 28 and substantially coincident with the radius of curvature of gutter 32. A pair of separate oppositely spiralled ribbons 64 and 66 are fixed to shaft 62 by means of radially extending arms indicated at 68. As best shown in FIGURE 2, ribbon 64 is mounted to the left of discharge screw 36 and ribbon 66 is mounted to the right of screw 36 so that upon rotation of shaft 62, the material entering between the flights of the ribbons by gravity is carried to the middle of bin 20 over opening 50. Ribbons 64 and 66 have a uniform diameter such that they extend into gutter 32 with a slight clearance.

The construction of collecting conveyor 60 is essentially the same, but of opposite hand, as that of conveyor 58 and comprises a rigid one piece shaft 70 suitably journalled in bin 20 about an axis extending parallel to and contained in the same horizontal plane as the rotational axis of shaft 62. Fixed to shaft 70 by means of radially extending arms 72 are a pair of oppositely spiralled ribbons 74 and 76 positioned one on each side of discharge screw 36. Ribbons 74 and 76 are of identical construction as that of ribbons 66 and 64 respectively and extend into gutter 34.

As best seen from FIGURE 2, ribbon 74 is spiralled in the same direction as ribbon 66 and ribbon 76 is spiralled in the same direction as ribbon 64 so that upon rotation of shafts 62 and 70, material is fed toward discharge screw 36 by both collecting screws.

As shown in FIGURE 5, shaft 70 is driven through a conventional chain and sprocket assembly 80 and a standard change speed mechanism 81 by motor 56. Shaft 62 is rotatably driven by a gear 82 which is fixed to the right-hand end of shaft 62 extending beyond end wall 28, as viewed from FIGURE 2, and which meshes with a gear 84 fixed to the corresponding end of shaft 70.

With reference now to FIGURES 4 and 6, shaft 70 is continuously driven in a clockwise direction and shaft 62, through meshing gears 82 and 84, is continuously driven at the same speed in the opposite or counterclockwise direction. Thus, in the operation of the discharge and collecting screw conveyors, material stored in bin 20 lowers by gravity to collecting screws 58 and 60 which move the material and carry it away from walls 26, 28, 22 and 24 respectively and toward discharge screw 36. Material so delivered to screw 36 is carried by screw 36 to outlet 44 where it discharges.

With continuing reference to FIGURES 6 and 7, as the material between the flights of ribbons 64, 66, 74 and 76 is axially carried toward screw 36 and away from walls 26 and 28, it is revolved about the axes of shafts 62 and 70, causing the masses above collecting screws 58 and 60 to be laterally shifted toward each other and away from walls 22 and 24 respectively and axially toward screw 36 and away from walls 26 and 28. Thus, the respective masses above collecting screws 58 and 60 tend to be shifted to a central position located between collecting screws 58 and 60 and over discharge screw 36. As a consequence, the combined lateral and axial movement of particles in one direction is restrained by the particles coming from the opposite direction. In this manner the pressure on particles adjacent to walls 22, 24, 26 and 28 resulting from the shift of the stored mass above collecting screws 58 and 60 is relieved with the result that these particles are not pressed against the walls of bin 20. Consequently, the particles do not adhere to the walls to build up formations on the walls of the receptacle.

The intersecting streams of cross currents of material meeting above and along screw 36 do not tend to pack but rather to inhibit any tendency to pack there.

Without the adhesion of particles on the walls of the bin, it will be appreciated that the entire mass delivered into the bin can be removed by screw 36 without leaving residue adhered to the bin walls which upon eventual build-up requires scraping to remove and which otherwise would interfere with the free gravitational movement of the particles toward the collecting screws 58 and 60.

In the operation of discharge screw 36, the mass supported by screw 36 has a generally horizontal movement imparted thereto which is in the same direction as the tangential component of the angular velocity at the upper periphery of screw 36. From the direction of rotation of screw 36 shown in FIGURE 6, the particles above screw 36 move generally toward side wall 22. This axial shift and resulting possibility of adherence to side wall 22 is contended with by the ribboned flights 64 and 66 of screw 58. The particles which do adhere to wall 22 are sheared off by the axial movement of material beyond the inner ends of flights 64 and 66 and over screw 36 which material movement is parallel to wall 22.

Thus, it will be appreciated that with the arrangement of collecting screws and discharge screw of the present invention, adherence of particles to the walls of bin 20 resulting from the movement imparted to the particles by rotation of the screws is substantially eliminated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An apparatus for removing a delivered mass of pigment and like material from a receptacle having a top inlet, opposing upright side walls and opposing upright end walls, and a bottom having an elongated opening extending between said side walls, comprising a discharge screw conveyor journalled for rotation about a horizontal axis and extending along said opening with its upper periphery arranged to receive material from said receptacle, a pair of substantially identical oppositely rotating collecting screw conveyors journalled for rotation about parallel spaced apart horizontal axes extending immediately above said discharge screw conveyor at right angles thereto and contained in the same plane, each of said collecting screw conveyors having oppositely pitched helical sections disposed one on each side of said discharge screw conveyor and operable to draw material from said receptacle and to feed it to said discharge screw conveyor, and means for concomitantly rotating said discharge screw conveyor and said collecting screw conveyors and for driving said collecting screw conveyors each in opposite directions, said collecting screw conveyors being of sufficiently large diameter to underlie and support substantially all of the material thereabove in the receptacle and being so constructed and arranged that upon rotation thereof said material is directed away from all of said walls and toward said discharge screw conveyor.

2. Apparatus for dispensing fluent substantially dry material in particle form comprising a hopper having upright side walls, a bottom wall and sufficiently open at the top to receive said material, means defining an elongated opening extending between two opposite side walls, a discharge screw conveyor rotatably mounted within the bottom of said hopper extending along said opening with its upper periphery receiving material from said receptacle for moving material longitudinally thereof from a region above it to a discharge means outside the hopper, and two side by side collecting screw conveyor assemblies rotatably mounted in said hopper above the level of said discharge conveyor on parallel axes that are normal to the axis of said discharge conveyor, each of said collecting conveyors having at opposite sides of said discharge conveyor screw flights so directed and so relatively disposed that they direct material poured into the hopper from above continuously toward said region above the screw conveyor both longitudinally and axially of said collecting conveyors and away from said side walls, so that said material does not pack against said walls, and said collecting conveyors being of sufficiently large diameter to underlie substantially all of the material delivered into the hopper.

3. In the apparatus defined in claim 2, said collecting screw conveyors being of appreciably larger diameters than the discharge conveyor, and the flights of each thereof on opposite sides of said discharge conveyor being of opposite hand and mounted on a common shaft that crosses above the level of the discharge conveyor.

4. In the apparatus defined in claim 3, said shafts being geared together for opposite rotation, and the diagonally opposite flights on said shafts being substantially identical.

5. A dispensing apparatus for particulate material of such character that relatively slight pressures may cause it to cake or adhere to receptacle walls comprising an upright receptacle having enclosing side walls and an elongated bottom opening extending between two opposed side walls through which material delivered into the open top of the material is removed, said dispensing apparatus comprising a discharge screw conveyor rotatably mounted on the lower portion of said receptacle extending along said opening and having its upper periphery facing the interior of said receptacle and operable to draw material from said receptacle through said opening and feed it into an outlet at one end of said opening, two collecting screw conveyors rotatably mounted within said receptacle above said discharge screw conveyor and extending between another two opposed side walls, said collecting conveyors being rotatable on parallel axes extending at right angles to the axis of said discharge conveyor and being operable to feed material down into the flights of said discharge screw conveyor, and means for concomitantly driving said discharge screw conveyor and said collecting screw conveyors, said collecting screw conveyors being so relatively rotated and having opposed flights on opposite sides of said opening so arranged relative to one another that particulate material thereabove is directed both longitudinally and laterally thereof away from all said side walls and toward the central portion of said receptacle above said discharge conveyor.

6. The dispensing apparatus defined in claim 5 wherein said collecting screw conveyors are of greater diameter than said discharge screw conveyor and of such dimensions that the laterally outer peripheries of all of said flights are disposed adjacent said first-named two side walls, the ends of all of said flights are disposed adjacent said other two opposed side walls, and the inner ends of all of said flights are disposed adjacent said projecting upper periphery of said discharge screw conveyor.

7. In combination with an upright pigment and like material receiving receptacle having an upper material intake, enclosing side walls and a medially located elongated bottom opening extending between two opposed side walls through which material delivered into the receptacle is removed, means for continuously feeding material from said receptacle through said opening and an outlet adjacent one end of said opening comprising a generally horizontally disposed rotatable discharge screw conveyor arranged in the lower part of said receptacle extending along said opening with its upper periphery receiving material from the interior of said receptacle, a pair of laterally spaced parallel generally horizontally disposed collecting screw conveyors mounted for rotation about axes extending substantially normal to and above the axis of said discharge screw conveyor in the bottom of said receptacle, said collecting screws having opposed flights on opposite sides of said opening and being operable to draw material from said receptacle and to feed said material into the flights of said discharge screw conveyor, and means for rotating said collecting screw conveyors in opposite directions, said conveyor flights being so constructed and arranged that the upper peripheries of the flights on the respective collecting screw conveyors travel toward each other and away from their adjacent side walls and the end flights of said collecting screw conveyors all direct said material away from said two opposed side walls toward said discharge screw conveyor.

8. The combination as defined in claim 7 wherein each of said collecting screw conveyors comprises a pair of oppositely pitched spiralled ribbon sections disposed one on each side of said discharge screw conveyor.

9. The combination as defined in claim 8 wherein said collecting screw conveyors are identical but of opposite hand and have diameters sufficiently large to support substantially all of the material in said receptacle.

10. In combination with an upright pigment and like material receptacle having an open top, enclosing side walls and a medially located elongated bottom opening extending between two opposed side walls through which material delivered into the open top of said receptacle is removed, means for feeding material from the receptacle through said opening and to an outlet at one end of said opening comprising a generally horizontally disposed rotatable discharge screw conveyor arranged in the lower portion of said receptacle and extending along and chiefly below said opening, and a pair of parallel horizontally disposed collecting screw conveyors mounted for rotation about axes extending substantially normal to and above the rotational axis of said discharge screw conveyor, said collecting screws having opposed flights on opposite sides of said opening and being operable to draw material from said receptacle and to feed material into the flights of said discharge screw conveyor and being rotated in such opposite directions that the upper peripheries of the flights of said collecting screw conveyors travel toward each other and away from the respective adjacent opposed side walls of said receptacle, each of said collecting screw conveyors comprising a pair of oppositely pitched spiralled ribbon section disposed one each side of said discharge screw conveyor, said screw conveyors being identical but of opposite hand and having diameters sufficiently large to provide a live bottom underlying the material delivered into said receptacle and thereby support substantially all of the material in said receptacle, and said discharge screw conveyor being of substantially smaller diameter than said collecting screw conveyors and projecting partly above the lowermost periphery of said ribboned sections such that material in said ribboned sections is fed generally horizontally into the flights of said discharge screw conveyor.

11. In apparatus for dispensing pigment or like pulverized material, a hopper having upright side walls, a top opening and a bottom, a discharge screw conveyor extending across the bottom of said hopper to an outlet and having its upper periphery disposed to receive material delivered into the interior of said hopper, and means for preventing said material from solidly arching over said discharge screw or adhering to said side walls comprising two parallel collecting screw conveyors extending across the bottom of said hopper at right angles to and above said discharge screw, each of said collecting screws having opposed flights at opposite sides of said discharge screw, and said collecting screws being of sufficiently large diameter to underlie substantially all material delivered into said hopper whereby when all of said screws are rotated material is directed away from all of the walls of said hopper and inwardly toward the interior of said hopper above said screw conveyor.

12. In apparatus for dispensing substantially particulate or like material such as pigment from a hopper having a top inlet and upright side walls so related that the horizontal cross-section of hopper space enclosed thereby does not decrease toward the bottom of the hopper, at least two relatively large diameter material collecting screw conveyors mounted for rotation upon parallel axes to extend across and substantially occupy the bottom of said hopper space, said conveyors being of such relative dimensions as to underlie and support substantially all of the material delivered into the top of the hopper, means for relatively rotating said screw conveyors, said conveyor rotation and said screw flights all being so constructed and arranged that said material is directed thereby away from all of said side walls, and conveyor means in the bottom of said hopper space below said conveyor screws for feeding said material from the central lower portion of said hopper space toward a discharge outlet.

References Cited in the file of this patent
UNITED STATES PATENTS

| | | |
|---|---|---|
| 2,687,244 | Peterson | Aug. 24, 1954 |
| 2,831,612 | Smith | Apr. 22, 1958 |
| 2,851,173 | Morrison | Sept. 9, 1958 |
| 2,947,524 | Bridges | Aug. 2, 1960 |